US010092137B1

(12) United States Patent
Nelson et al.

(10) Patent No.: US 10,092,137 B1
(45) Date of Patent: Oct. 9, 2018

(54) CONVERTIBLE FOOD DELIVERY BAG WITH AN ADJUSTABLE DIVIDER

(71) Applicant: Amazon Technologies, Inc., Seattle, WA (US)

(72) Inventors: Brent Stephen Nelson, Seattle, WA (US); Justine Lea Mahler, Seattle, WA (US); Agnes Gerner, Seattle, WA (US); Maciej Golonka, Redmond, WA (US); Jenna Lee Walsh, Batavia, IL (US); Brent William Lindberg, Saint Charles, IL (US)

(73) Assignee: Amazon Technologies, Inc., Seattle, WA (US)

( * ) Notice: Subject to any disclaimer, the term of this patent is extended or adjusted under 35 U.S.C. 154(b) by 160 days.

(21) Appl. No.: 15/087,617

(22) Filed: Mar. 31, 2016

(51) Int. Cl.
  *B65D 25/04* (2006.01)
  *A47J 41/00* (2006.01)
  *B65D 81/38* (2006.01)

(52) U.S. Cl.
  CPC ....... *A47J 41/0066* (2013.01); *A47J 41/0083* (2013.01); *B65D 81/38* (2013.01); *B65D 81/3888* (2013.01)

(58) Field of Classification Search
  CPC ... A47J 41/0066; A47J 41/0083; B65D 81/38; B65D 81/3888
  USPC .............. 220/530, 592, 592.25, 592.03, 529
  See application file for complete search history.

(56) References Cited

U.S. PATENT DOCUMENTS

| | | | | |
|---|---|---|---|---|
| 6,026,646 A | * | 2/2000 | Hansen | B60N 3/104 220/6 |
| 2007/0228097 A1 | * | 10/2007 | Recanati | A45C 13/02 224/580 |
| 2009/0052809 A1 | * | 2/2009 | Sampson | B65D 81/389 383/38 |
| 2010/0270317 A1 | * | 10/2010 | Kieling | A45C 3/001 220/592.25 |
| 2010/0294816 A1 | * | 11/2010 | Sentell | A45F 5/02 224/148.3 |
| 2011/0259894 A1 | * | 10/2011 | Cheung | A45C 11/20 220/592.01 |
| 2013/0341338 A1 | * | 12/2013 | Mitchell | A45C 11/20 220/592.2 |
| 2014/0251515 A1 | * | 9/2014 | Hansen | A45C 3/06 150/113 |

(Continued)

*Primary Examiner* — J. Gregory Pickett
*Assistant Examiner* — Niki M Eloshway
(74) *Attorney, Agent, or Firm* — Lee & Hayes, PLLC (57) ABSTRACT

A thermal insulated delivery bag is configured for use with both hot and cold food delivery. The bag converts shape from a horizontal configuration to a vertical (tote) configuration which may optimize use depending on the type of food to be transported. For example, the horizontal configuration may accommodate large flat items while the vertical configuration may accommodate other items, which may be divided into separate internal sections by a divider. The bag includes a divider system to accommodate change in the size of two or more separate internal sections (e.g., segregating cold and hot items). The divider system enables movement/repositioning to change the size of the internal sections while maintaining a substantial thermal isolation of each internal section. In some embodiments, the divider may be held in a position/orientation by coupling of magnets to one or more ferrous strips in the bag.

20 Claims, 12 Drawing Sheets

Cross Section B-B (56) References Cited

U.S. PATENT DOCUMENTS

| | | | |
|---|---|---|---|
| 2015/0344182 A1* | 12/2015 | Malin | B65D 5/48048 206/299 |
| 2016/0059990 A1* | 3/2016 | Patikas-Bryant | B65D 21/086 220/523 |
| 2016/0095400 A1* | 4/2016 | Lawton | A45C 3/12 206/292 |
| 2016/0101924 A1* | 4/2016 | Mitchell | A45C 7/0077 220/592.2 |

* cited by examiner

Cross Section B-B

FIG. 6

Cross Section A-A

Cross Section C-C

FIG. 11

Cross Section B-B

FIG. 12

CONVERTIBLE FOOD DELIVERY BAG WITH AN ADJUSTABLE DIVIDER

BACKGROUND

Many restaurants deliver food to customers' residences. In particular, the pizza delivery industry has delivered millions of premade pizzas to customers' homes, places of work, or other locations over the years. Some restaurants deliver food in plastic or paper bags, which are inefficient at maintaining the food at a relatively hot or cold temperature. When using plastic or paper bags, the food temperature quickly moves towards the surrounding environment temperature during the delivery since plastic and paper bags do not provide efficient thermal insulation. Many pizza delivery companies use thermally insulated bags specifically made to transport pizzas, but these bags are ineffective at delivering other types of food items. In addition, these pizza bags include only a single internal compartment or cavity.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 8 is a side elevation view of a left side of the convertible food delivery bag. FIG. 8 also shows Detail A showing closure of the convertible food delivery bag and Detail B showing layers of a panel.

FIG. 12 is a cross sectional side elevation view of the convertible food delivery bag showing the interior side of a back panel of the convertible food delivery bag that includes strips to couple to a moveable divider. FIG. 12 also shows a first divider panel coupled to the strips, a second bendable divider panel coupled to the strips, and a third bendable divider panel coupled to the strips.

DETAILED DESCRIPTION

This disclosure is directed to a thermal insulated delivery bag that is configured for use with both hot and cold restaurant food delivery. In accordance with various embodiments, the bag converts shape from a horizontal configuration to a vertical configuration which may optimize use depending on the type of food and/or item to be transported. For example, the horizontal configuration may accommodate pizza boxes or other platters or large flat items while the vertical configuration may accommodate premade meals and other food or items, which may be divided into separate internal sections by a divider. As used herein, the term "food" is intended to include "beverages" unless otherwise noted. Items may include items that are temperature sensitive such as biological items (e.g., cell cultures, blood samples, etc.), electronics, food, pharmaceuticals, and/or any other temperature sensitive items.

The bag includes a unique divider system to accommodate easy change in the size of two separate internal sections (e.g., segregating cold and hot food or two different temperature zones). The benefit of the divider system is that it is very easily moved/repositioned to change the size of the internal sections while maintaining a substantial thermal isolation of each internal section. In some embodiments, the divider may be held in a position/orientation by coupling of magnets to one or more ferrous strips or other magnets in the bag. The divider may also reduce movement/spillage/damage of food or items during delivery.

The bag may include beverage holders that swivel or rotate to keep a beverage upright in either the vertical configuration or the horizontal configuration. The bag may include other features to secure items to the interior and/or exterior of the bag. At least some panels that form the sides of the bag may include rigid features to maintain a shape of the bag. For example, the bag may be formed of a fabric. In some embodiments, the fabric may be selected based on the fabric having various properties, such as resistance to odor, resistance to wear, resistance to discoloration or staining, and/or other properties.

The apparatus described herein may be implemented in a number of ways. Example implementations are provided below with reference to the following figures.

Figure 1:
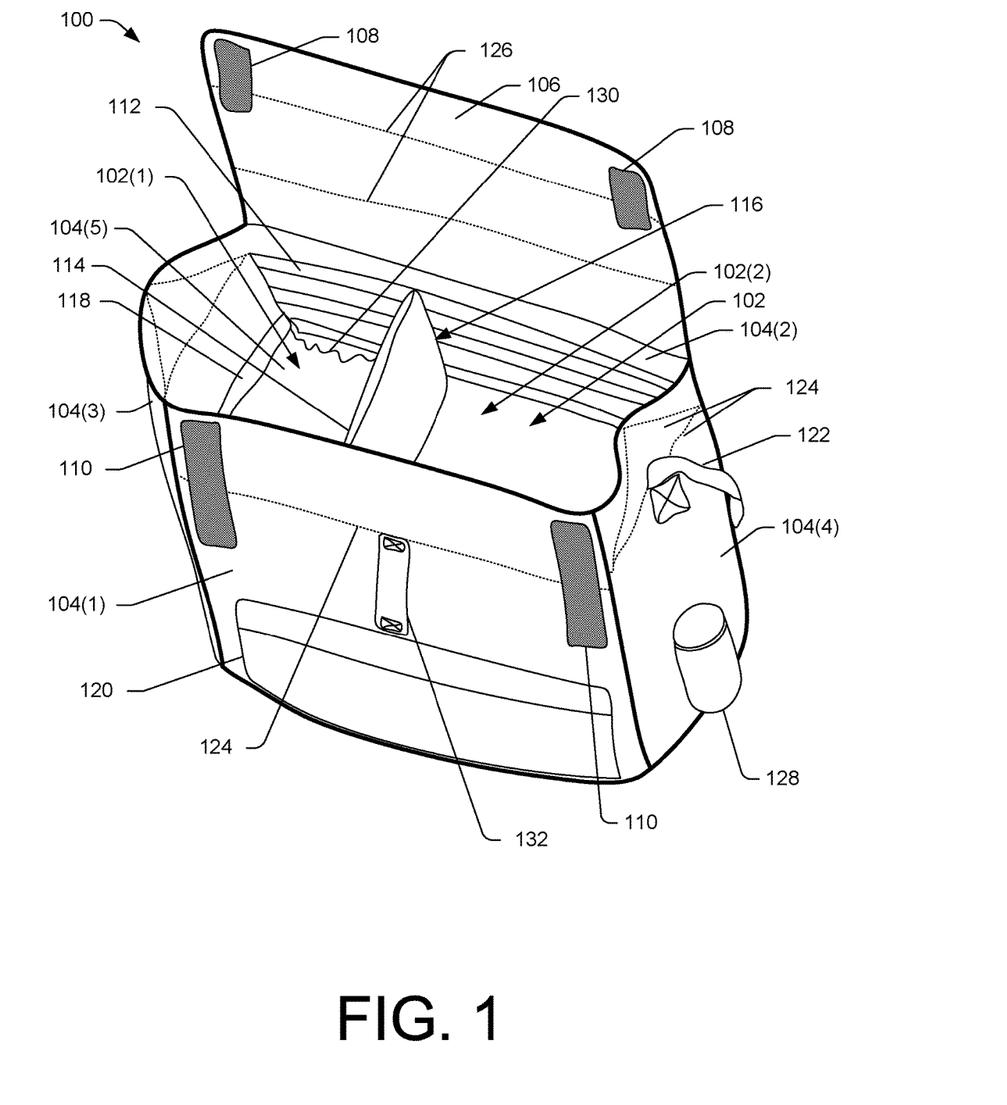
FIG. 1 is a perspective view of an illustrative convertible food delivery bag with an adjustable divider shown with a cover open.

FIG. 1 is a perspective view of an illustrative convertible food delivery bag 100 (or simply "bag") with an adjustable divider 114 shown with a cover in an open position. In some embodiments, the bag 100 may be a soft-sided container; however, rigid or semi-rigid materials may also be used to form the bag 100. The bag 100 may be formed primarily of nylon fabric or other materials that resist wear, resist stains, and resist smell.

The bag 100 may include a cavity 102 defined by panels 104. The panels may include at least a front panel 104(1) located opposite a back panel 104(2), a left side panel 104(3) located opposite a right side panel 104(4), and a bottom panel 104(5). The left side panel 104(3) may be coupled between ends of the front panel 104(1) and the back panel 104(2). The right side panel 104(4) may be coupled between ends of the front panel 104(1) and the back panel 104(2). The bottom panel 104(5) may be coupled between the front panel 104(1), the back panel 104(2), the left side panel 104(3), and the right side panel 104(4). In some embodiments, at least some of the panels 104 may be stitched together. In various embodiments, some panels may be formed of a same piece of material, such as material that wraps around multiple sides of the bag 100.

The bag 100 may include a cover 106, also referred to herein as a flap. The cover 106 may be coupled to the back panel 104(2). In some embodiments, the back panel may extend upward past the side panels 104(3)-(4) to create the cover 106. The cover 106 may include first securing mechanisms 108 which may secure the cover 106 to second securing mechanisms 110 located on the front panel 104(1). The cover 106 may be used to selectively close access to the cavity 102 when the cover is secured in a closed position via the first securing mechanisms 108 and the second securing mechanisms 110. The first securing mechanisms 108 and the second securing mechanisms 110 may include snaps, magnets/ferrous material, hook and loop closures, zippers, and/or other types of securing mechanisms that engage a counterpart securing mechanism.

In accordance with one or more embodiments, the bag 100 may include strips 112 that extend at least partially across the front panel 104(1) and the back panel 104(2). The strips 112 may extend horizontally between the left side panel 104(3) and the right side panel 104(4) and may be oriented substantially parallel to the bottom panel 104(5). In some embodiments, the strips 112 may be formed or include a ferrous metal or a magnet. However, the strips may also be formed of hooks or loops, a slider bar (e.g., a "U" shaped bar), snaps, or other materials and/or configurations that enable a complementary coupling device to engage the strips 112, as explained below. For example, the strips may be strips of hooks or loops (e.g., sheets of a continuous coupling mechanism, patches of a coupling mechanism, etc.). The strips 112 may also provide rigidity to the front panel 104(1) and the back panel 104(2) and maintain a separation distance between the left side panel 104(3) and the right side panel 104(4). In some embodiments, material proximate the strips may be colored differently than another interior color to enable a user to easily identify a location of the strips.

A divider panel 114 may divide the cavity 102 into a first interior cavity 102(1) and a second interior cavity 102(2). The divider panel 114 may have a width that spans between the front panel 104(1) and the back panel 104(2) when the divider panel 114 is inserted into the cavity 102 of the bag 100. The divider panel 114 may include coupling features located along ends 116 of the divider panel 114 to couple to the strips 112 located in the front panel 104(1) and the back panel 104(2). The orientation and position of the divider panel 114 may be secured by the coupling between the coupling features of the divider panel 114 and the strips 112. In some embodiments, the coupling features of the divider panel 114 may be magnets, ferrous metal, hooks or loops, a mechanism to engage a slider bar, and/or other materials and/or configurations that enable a complementary coupling to engage the strips 112. The coupling features and strips 112 enable a user to move the divider panel 114 within the cavity 102 to change the size of the first internal cavity 102(1) and the size of the second internal cavity 102(2). In some embodiments, multiple divider panels may be used in the bag 100.

The first interior cavity 102(1) may be at least partially thermally isolated from the second interior cavity 102(2) within the cavity 102 when the divider panel 114 is secured in the cavity 102 and the cover 106 is coupled to the front panel 104(1). The panels 104, including the divider panel 114, may be formed of one or more thermally insulating materials that inhibit heat transfer (or transfer of cold air) through the panels. Thus, the first interior cavity 102(1) may be used to maintain a temperature of a first food item near a first temperature (e.g., a hot temperature associated with cooked food that is ready to eat or near ready to eat, etc.) while the second cavity 102(2) may be used to maintain a temperature of a second food item or beverage near a second temperature (e.g., a cold temperature, a less hot temperature than the first temperature, etc.). In some embodiments, at least some of the panels 104 and/or the divider panel 114 may include securing mechanisms 118 that may secure a food item (including beverages) to a corresponding panel. For example, the securing mechanism may be an elastic strap that is sewn or stitched to a panel on two different ends and may be used to tether or secure an item against a panel. The strap may be a different color than other portions of the bag 100 to enable a user to easily identify and locate the strap.

In some embodiments, the bag 100 may include one or more pockets 120 to store items such as utensils, napkins, paperwork, and/or other things related to the delivery of food items. The pockets may be gusseted pockets, flat pockets, covered pockets, and/or other types of pockets. The bag 100 may include interior and/or exterior pockets, some with or without covers. The bag may also include a strap 122 to assist in carrying the bag 100. The bag 100 may also include one or more handles, as discussed below.

In various embodiments, the bag 100 may include creases 124 (also called "fold lines"), which may be used to fold a portion of a panel to change a volume of the cavity 102 of the bag 100. When the panels 104 are not folded, the volume may be a first volume and internal dimensions of the bag 100 may be well suited for transport of standard size pizza boxes while the bag 100 is used in a horizontal configuration. When at least some of the panels 104 are folded along the creases 124, the volume may be a second volume that is smaller than the first volume and the bag 100 may be used in a vertical (tote) configuration where ready-made meals are placed in the interior cavities, for example. The cover 106 may include cover creases 126 which may enable the cover 106 to fold to secure the cover to the front panel 104(1) in either the horizontal or vertical configurations.

The bag 100 may include a beverage holder 128, or possibly multiple beverage holders 128. The beverage holder 128 may be coupled to an exterior side of at least one of the side panels (e.g., the left side panel 104(3) and/or the right side panel 104(4)), or possibly other panels of the panels 104. The beverage holder may include an adjustable coupler, such as a swivel mechanism, magnets/ferrous materials, and hook and loop constructions, which enables securely positioning a beverage container in an upright position in the beverage holder when the container is used in a horizontal configuration and when the container is used in a vertical configuration. The swivel mechanism may be formed of at least one of a ball-and-joint mechanism, an axle and housing that rotates on the axle, or other similar structures that permit rotation or movement. The swivel mechanism be adjusted automatically, such as by weights, or manually, to keep the beverages upright. In some embodiments, the swivel mechanism may lock, snap, or otherwise be secured in a position to keep the beverage upright during transit. The beverage holder 128 may include a securing mechanism, such as an elastic band or other feature to secure the beverage in the beverage holder 128 and keep the beverage from inadvertently falling out of the beverage holder 128 as well as adapt to multiple beverage geometries and sizes.

In some embodiments, a tether 130 may couple the divider panel 114 to the bag to prevent separation of, and possibly loss of, the divider panel 114 from the bag 100. The tether 130 may be formed of a string, elastic material, wire, planar piece of fabric, or other line or cord. The tether 130 may have a length selected to enable movement of the divider panel 114 about the cavity 102 of the bag as discussed here, while preventing separation of the divider panel 114 from the bag 100.

The front panel 104(1) may include a handle 132 to enable a user to carry the bag 100. The handle 132 may be optimized for carrying the bag 100 in the horizontal configuration (e.g., stowed with one or more pizza boxes or other items). The handle 132 or multiple handles may be located on any of the surfaces of the bag 100.

Figure 2:
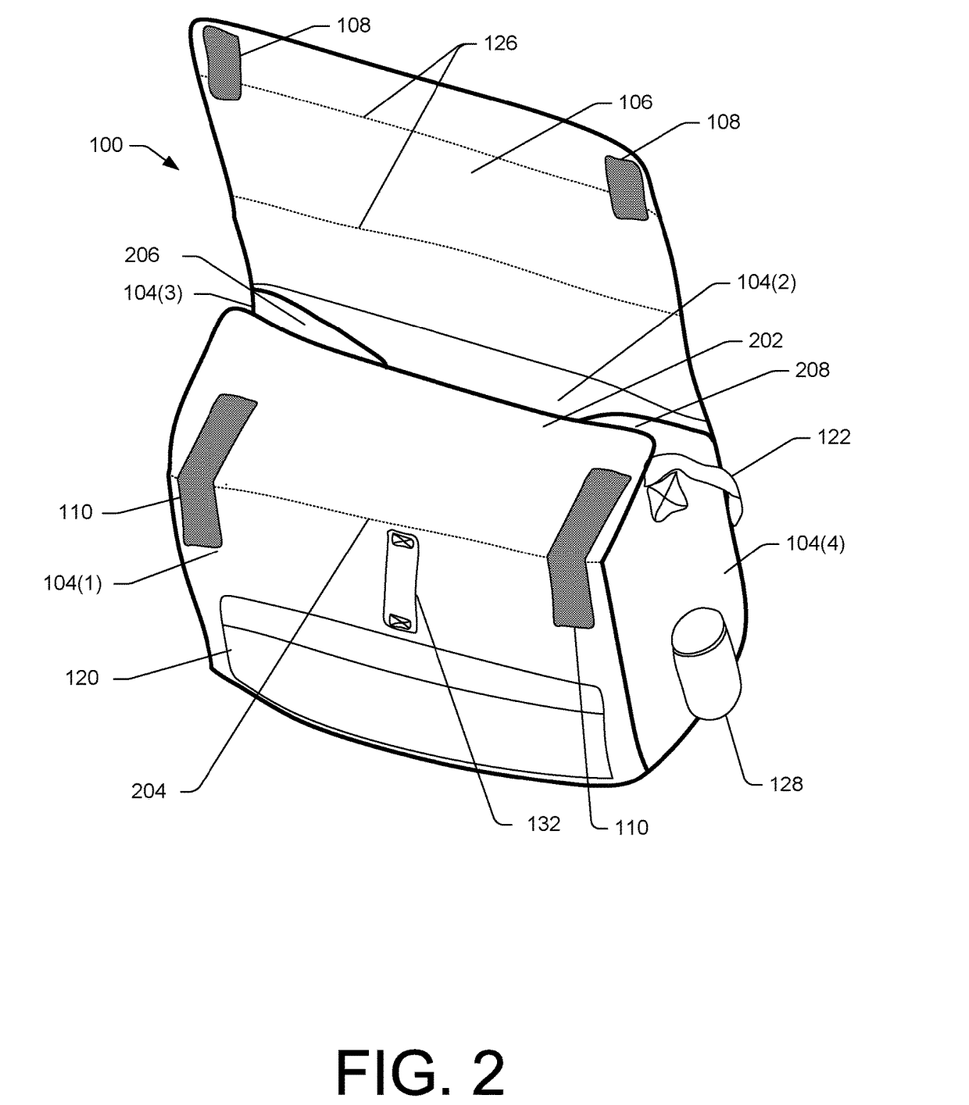
FIG. 2 is a perspective view of an illustrative convertible food delivery bag with an adjustable divider shown with a cover partially closed.

FIG. 2 is a perspective view of the illustrative convertible food delivery bag 100 with divider panel 114 shown partially closed. As shown, the bag 100 is in the vertical (tote) configuration. A first portion 202 of the front panel 104(1) is folded about a crease 204 to at least partially enclose the cavity 102 (shown in FIG. 1) and to reduce the height of the bag 100. Likewise, the left side panel 104(3) includes a second portion 206 folded inward (towards the right side panel 104(4)) along one of the creases 124 (shown in FIG. 1) and the right side panel 104(4) includes a third portion 208 folded inward (towards the left side panel 104(3)) along one of the creases 124 (shown in FIG. 1). Thus, the internal volume of the bag 100 is defined by a second volume (shown in FIG. 2) that is smaller than a first volume when portions of the right panel and the left panel are folded inward toward the divider panel 114 along creases formed in the right side panel 104(4) and left side panel 104(3). As discussed above, the creases enable the bag to convert from having the first volume configured in a first shape to stow a first food item(s) (e.g., stow pizza box(es), a serving platter, etc.) in a horizontal configuration to a second volume configured in a second shape to stow a second food item(s) (e.g., prepared meals, etc.) in a vertical configuration (shown in FIG. 2). In contrast, the bag 100 may have the first volume when the left side panel 104(3) and the right side panel 104(4) are substantially planar and not folded along the creases.

Figure 3:
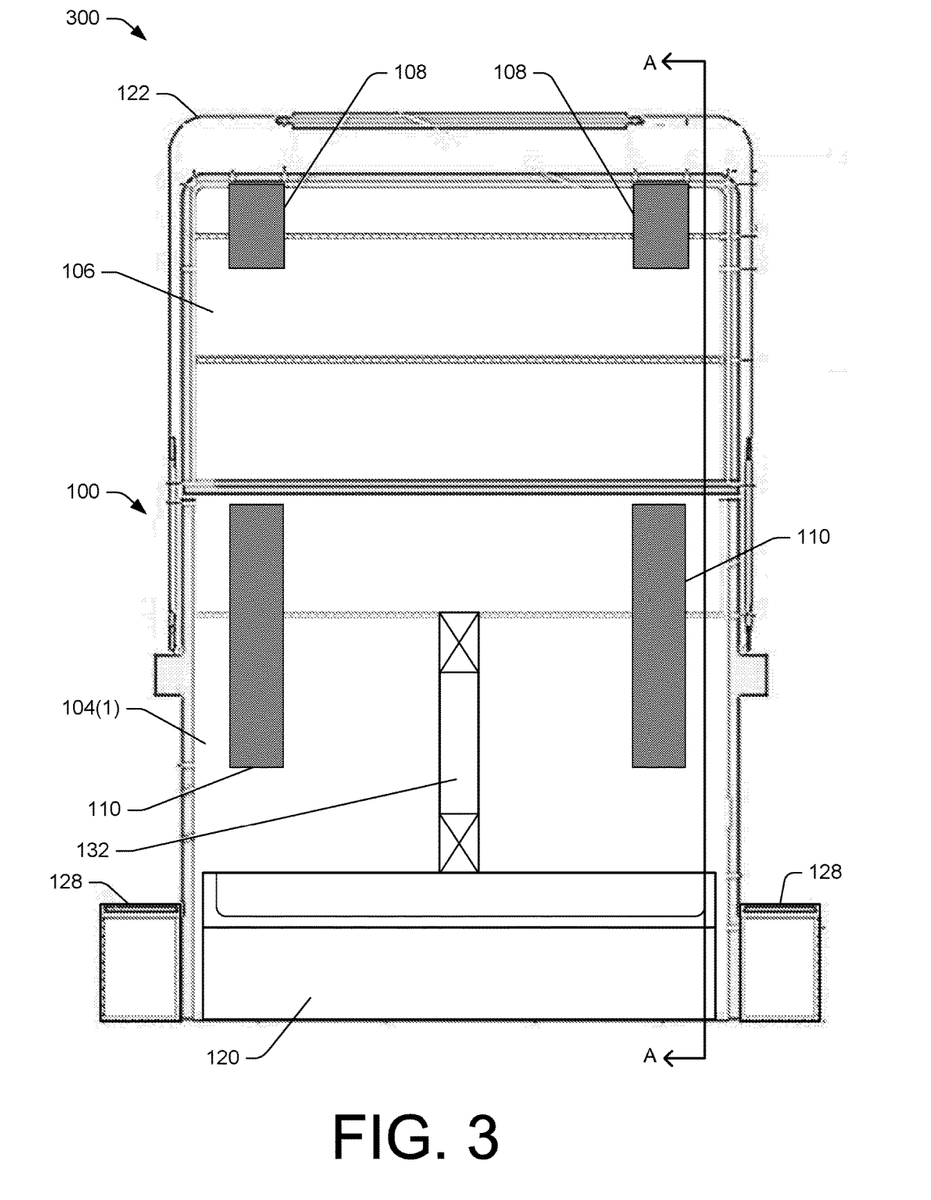
FIG. 3 is a side elevation view of a front side of the convertible food delivery bag.

FIG. 3 is a side elevation view of a front side 300 of the convertible food delivery bag 100. The front side 300 shows the exterior of the front panel 104(1), which may include the handle 132 to enable a user to carry the bag 100. The handle 132 may be optimized for carrying the bag 100 in the horizontal configuration (e.g., stowed with one or more pizza boxes or other items).

As discussed above, the bag 100 may include the beverage holder 128, or possibly multiple beverage holders 128. The beverage holder 128 may be coupled to an exterior side of the left side panel 104(3) and/or the right side panel 104(4)), or possibly other panels of the panels 104.

Figure 4:
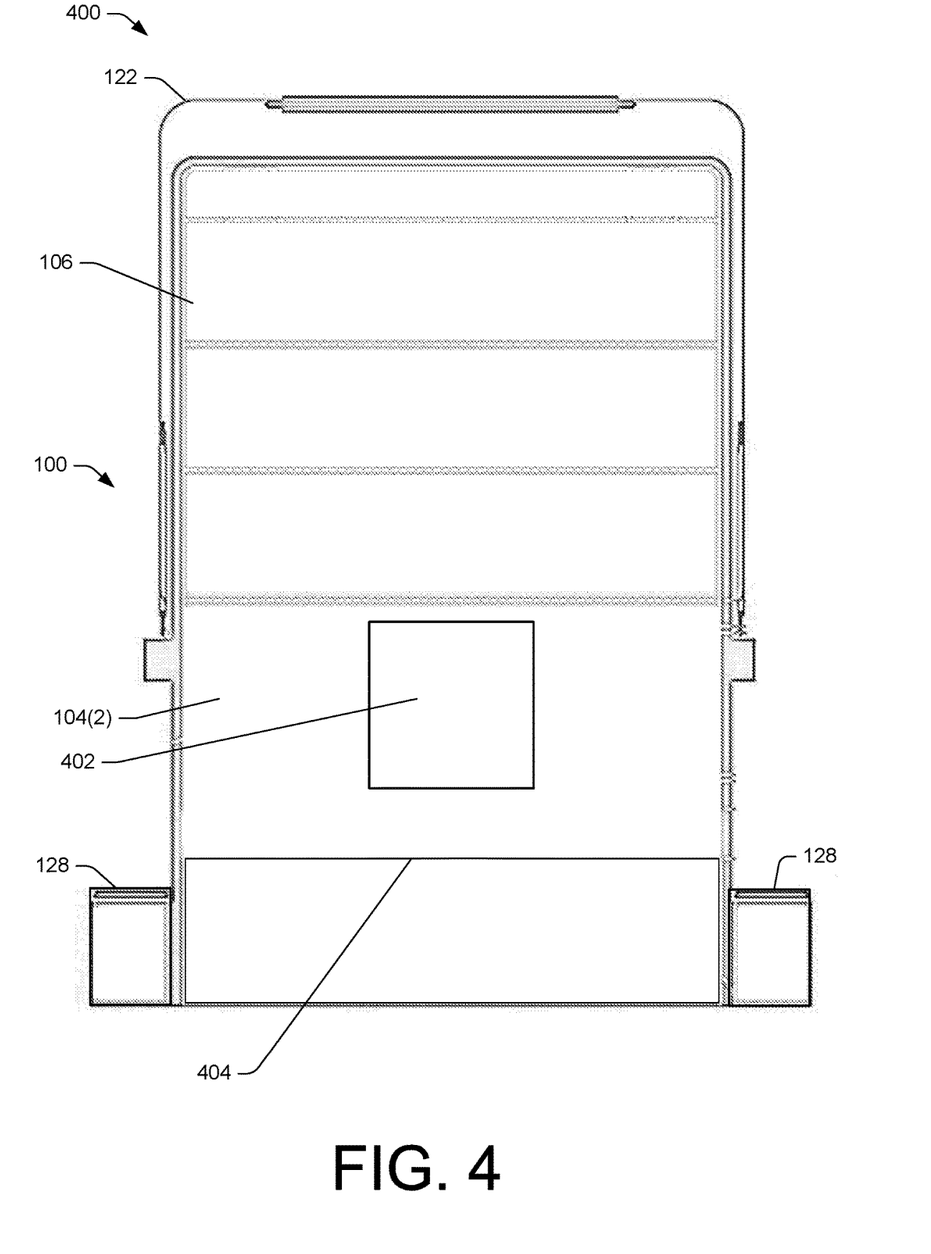
FIG. 4 is a side elevation view of a back side of the convertible food delivery bag.

FIG. 4 is a side elevation view of a back side 400 of the convertible food delivery bag 100. The back side 400 shows the exterior of the back panel 104(2), which may include a location for a logo 402 or for other information, possibly secured via a transparent pocket window, such as delivery information (e.g., an address, a name, a phone number, an identifier, and/or a list of contents, etc.). However, the logo 402 or other information may be located on other surface of the bag 100, and possibly in multiple locations. The exterior of the back panel 104(2) may include a pocket 404 to store items. The pocket 404 may be a gusseted pocket, a flat pocket, a covered pocket, and/or another type of pocket.

Figure 5:
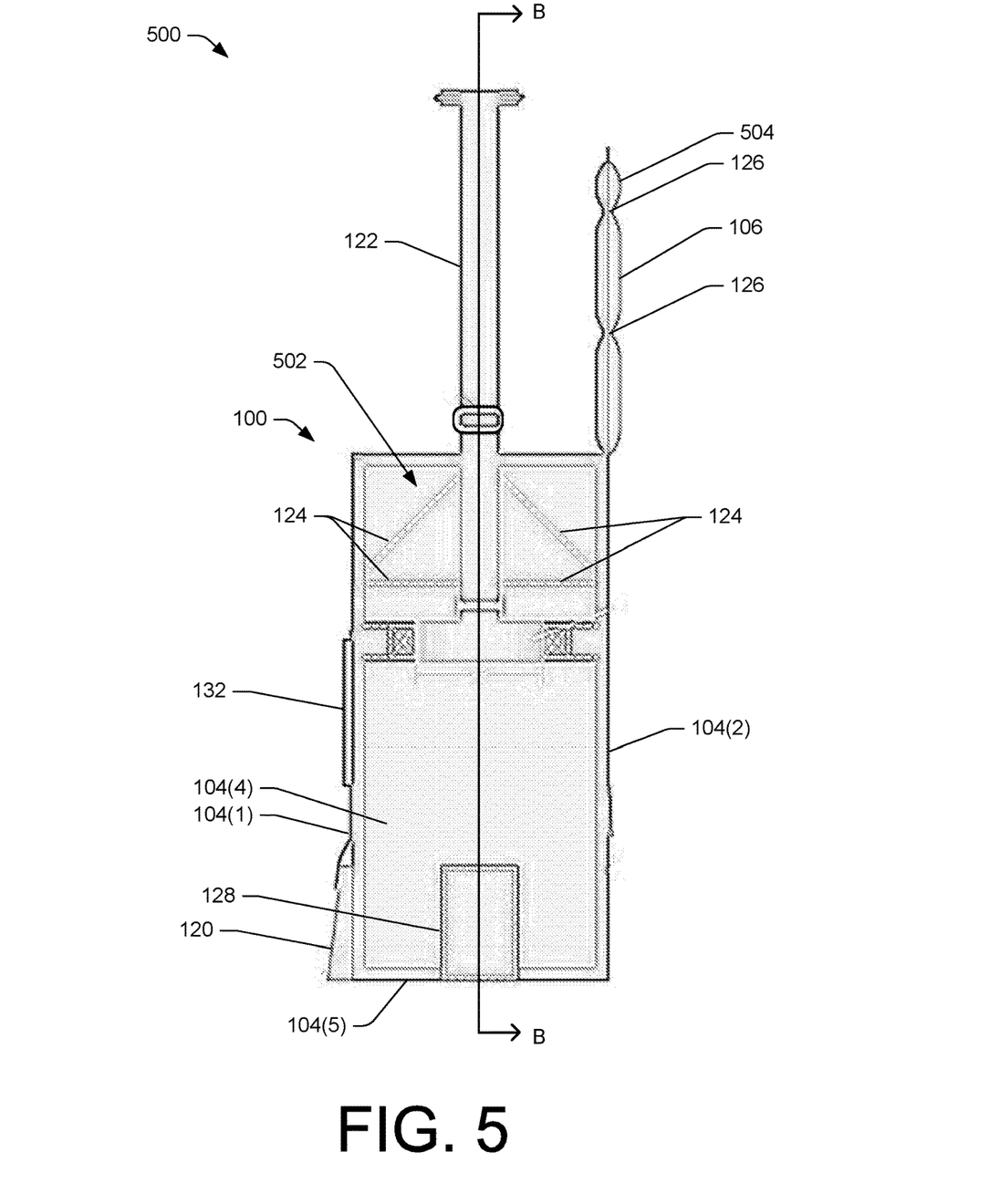
FIG. 5 is a side elevation view of a right side of the convertible food delivery bag.

FIG. 5 is a side elevation view of a right side 500 of the convertible food delivery bag. The right side 500 illustrates the creases 124 located on the right side panel 104(4) that assist in folding the top portion 502 of the right side panel inward (toward the left side panel 104(3)), to reduce the interior volume of the bag 100. In addition, the right side view 500 illustrates an illustrative profile of the cover 106, including the creases 126 that enable a cover portion 504 of the cover 106 to bend over a lip to secure the cover 106 to the front panel 104(1) when the bag 100 is in a closed position, such as during transport of the bag 100. The right side 500 also shows the pocket 120 in an expanded state, such as when filled with utensils, napkins, paperwork, and/or other items.

Figure 6:
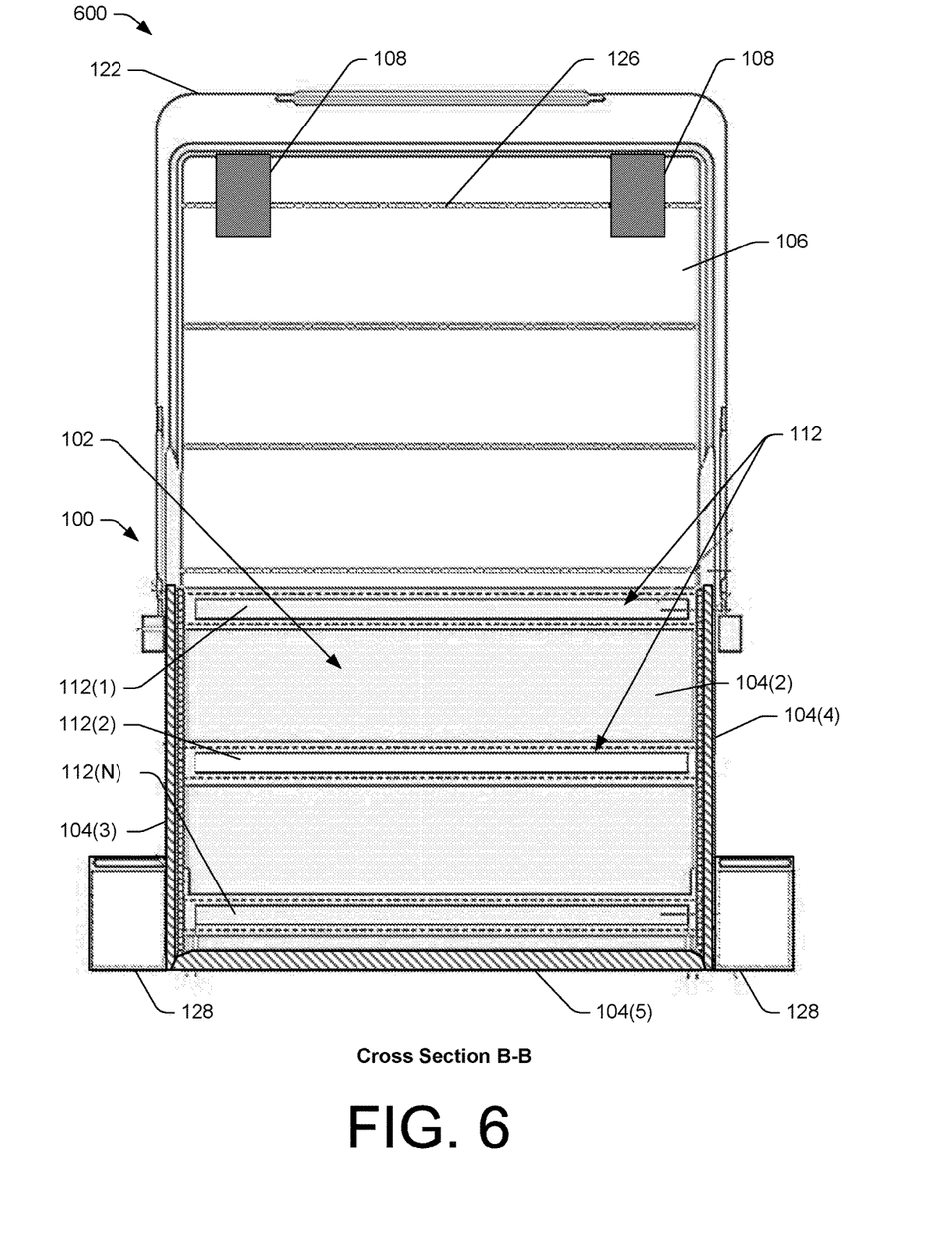
FIG. 6 is a cross sectional side elevation view of the convertible food delivery bag showing the interior side of a back panel of the convertible food delivery bag that includes strips to couple to a moveable divider.

FIG. 6 is a cross sectional side elevation view of a Section B-B from FIG. 5 of the convertible food delivery bag showing an interior side 600 of the back panel 104(2) of the convertible food delivery bag 100 that includes the strips 112 to couple to the divider panel. The interior side 600 shows three strips 112(1), 112(2), and 112(N). However, more or fewer of the strips 112 may be used to secure the location and orientation of the divider panel as discussed herein. In some embodiments, the strips 112 may be spaced apart (possibly evenly apart) to provide a first strip 112(1) that couples to an upper portion of the divider panel, a second strip 112(2) that couples to a middle portion of the divider panel, and a third strip 112(N) that couples to a lower portion of the divider panel. The strips 112 may be formed or include a ferrous metal or a magnet. However, the strips 112 may also be formed of hooks or loops, a slider bar (e.g., a "U" shaped bar), or other materials and/or configurations that enable a complementary coupling device to engage the strips 112. In various embodiments, the strips 112 may be secured to the panels by a cover that is sewn or stitched into fabric of the front panel 104(1) and the back panel 104(2) while maintaining a substantially smooth interior surface or portion of the interior surface of the front and back panels. The smooth surface, when mated and coupled to a smooth edge surface of the divider panel, may create a tight thermally insulated seal that inhibits a change in temperature in each of the internal cavities discussed above. A slight or minimal leakage of air between internal cavities may be within acceptable design requirements since most insulation is susceptible to some thermal loss or leakage. In some embodiments, the strips 112 comprise at least two ferrous strips coupled to the front panel and at least two ferrous strips coupled to the back panel, and wherein the coupling features of the divider panel that engage the strips 112 are magnets. The strips 112 enable the divider panel to be selectively moved or slid (by a person) toward the left side panel 104(3) or toward the right side panel 104(4). The strips 112 may also enable placement of the divider panel in a horizontal position (e.g., along a single strip on the back panel 104(2)), in a diagonal orientation, and/or in a bent, modified, or special orientation (possibly using a special bendable or malleable divider panel). In some embodiments, the strips may be used to secure the cover 106 to the front panel 104(1), such as when the front cover 104(1) includes a magnet that attracts to a strip of the strips 112 to secure the bag 100 in the closed position.

Figure 7:
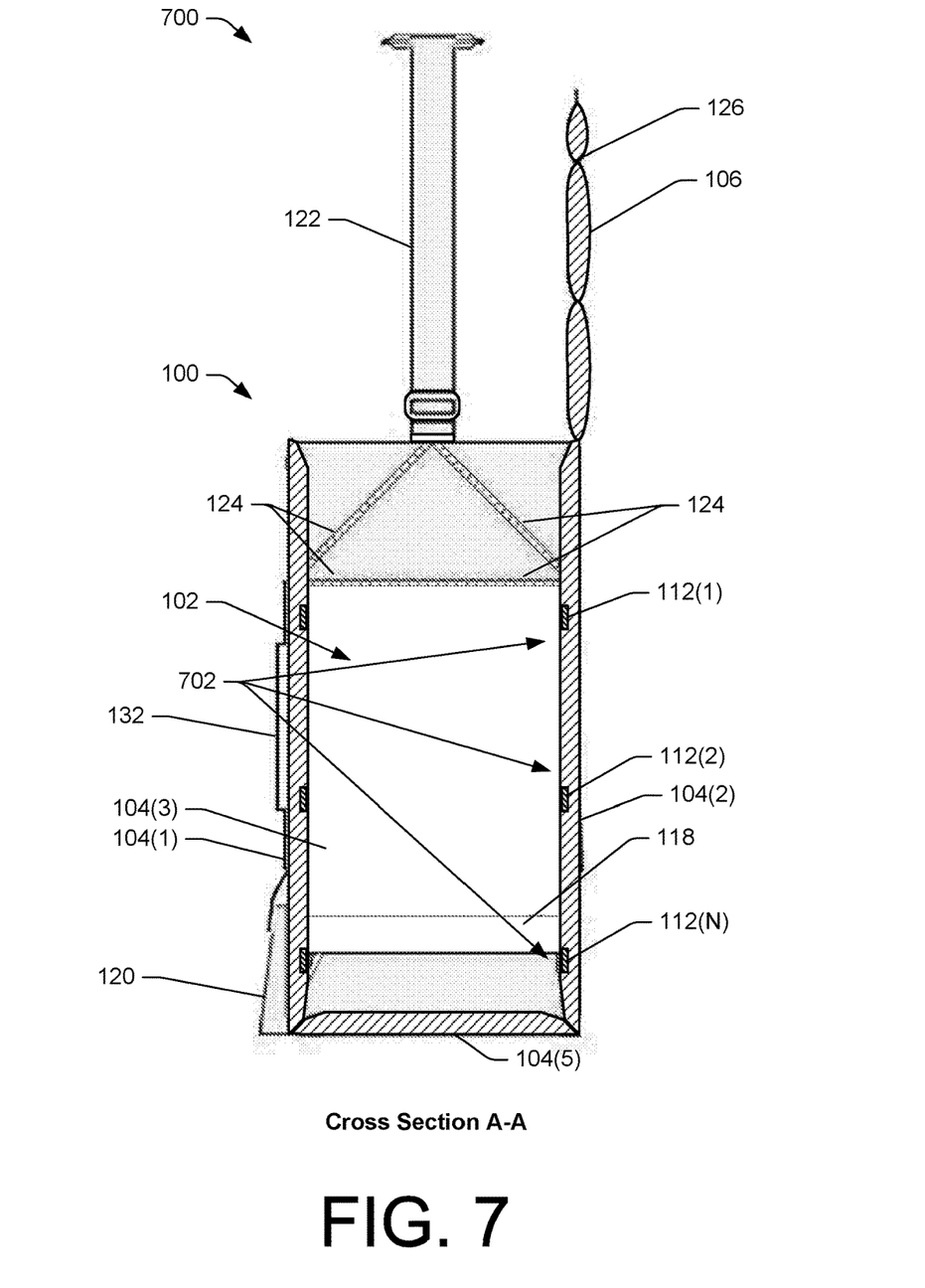
FIG. 7 is a cross sectional side elevation view of the convertible food delivery bag showing interior sides of the front panel and the back panel of the convertible food delivery bag that includes strips to couple to a moveable divider.

FIG. 7 is a cross sectional side elevation view of a Section A-A from FIG. 3 of the convertible food delivery bag 100 showing interior sides 700 of the front panel 104(1) and the back panel 104(2) of the convertible food delivery bag 100 that includes the strips to couple to the divider panel. The interior sides 700 show the recessed strips 112, such as the strips 112(1), 112(2), and 112(N). However, more or fewer strips may be used. The interior surface of the front panel 104(1) and the interior surface 702 of the back panel 104(2), or portions thereof, may be substantially smooth. The interior surface 702, when mated and coupled to a smooth edge surface of the divider panel, may create a tight thermally insulated seal that inhibits a change in temperature in each of the internal cavities discussed above.

As shown in FIG. 7, at least some of the panels 104 may include securing mechanisms 118 that may secure a food item (including beverages) to a corresponding panel. For example, the securing mechanism 118 may be an elastic strap that is sewn or stitched to at least the left side panel 104(3) on two different ends of the securing mechanism 118, and that tethers or secures an item against a panel.

Figure 8:
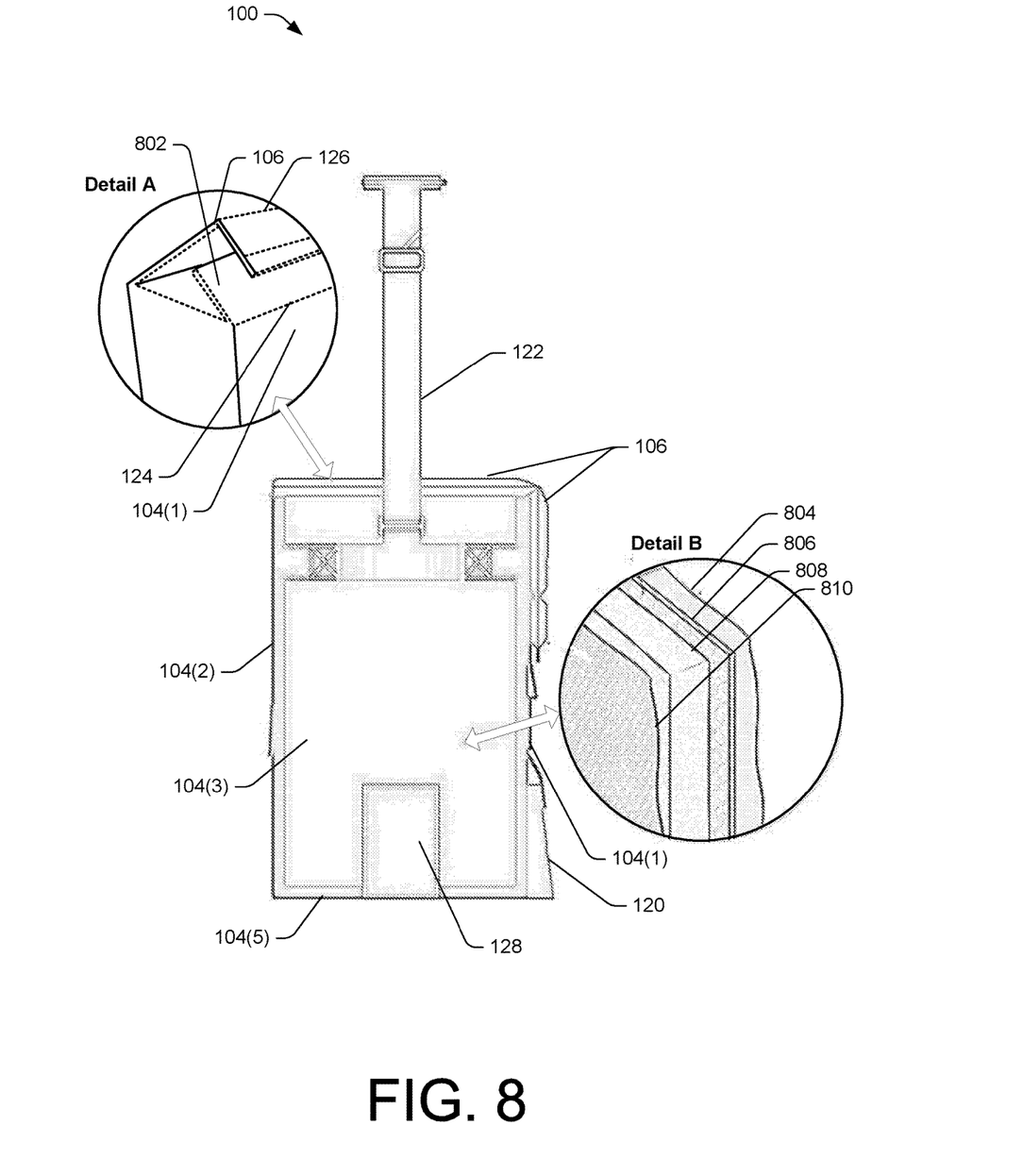

FIG. 8 is a side elevation view of a left side of the convertible food delivery bag. FIG. 8 also shows a Detail "A" showing closure of the convertible food delivery bag and a Detail "B" showing layers of a panel. Detail A shows an illustrative closing operation of the cover 106 toward the front panel 104(1), where the cover 106 bends at one of the creases 126. A portion 802 of the front panel 104(1) may bend inward (toward the back panel 104(2)) at the crease 124 to create the smaller volume in the vertical (tote) configuration.

Detail B shows layers of the left side panel 104(3), which may be the same as the layers of at least the right side panel and/or other panels, with the exception of the strips 112 that are also included in at least the front panel 104(1) and back panel 104(2). A first layer 804 may be an inner fabric, which may be a water proof layer that is positioned adjacent to the interior of the bag 100. An example of the first layer 804 may be a nylon fabric with a water resistant backing. A second layer 806 may be a rigid or partially rigid panel or compressed fiber. An example of the second layer may be a honeycomb board or plastic panel. The second layer 806 may maintain a separation distance between the front panel 104(1), the back panel 104(2). In some embodiments, the second layer 806 may be removable for shipping purposes. A third layer 808 may be insulation, which may be a foam or core. A fourth layer 810 may be an outer fabric. An example of the fourth layer 810 may be a nylon fabric. The fabric may be selected to have resistance to odor, resistance to wear, resistance to discoloration or staining, and/or have other desirable properties. In some embodiments, the front panel 104(1), the back panel 104(2) and/or the bottom panel 104(5) may comprise at least the first layer 804, the third layer 808, and the fourth layer 810.

Figure 9:
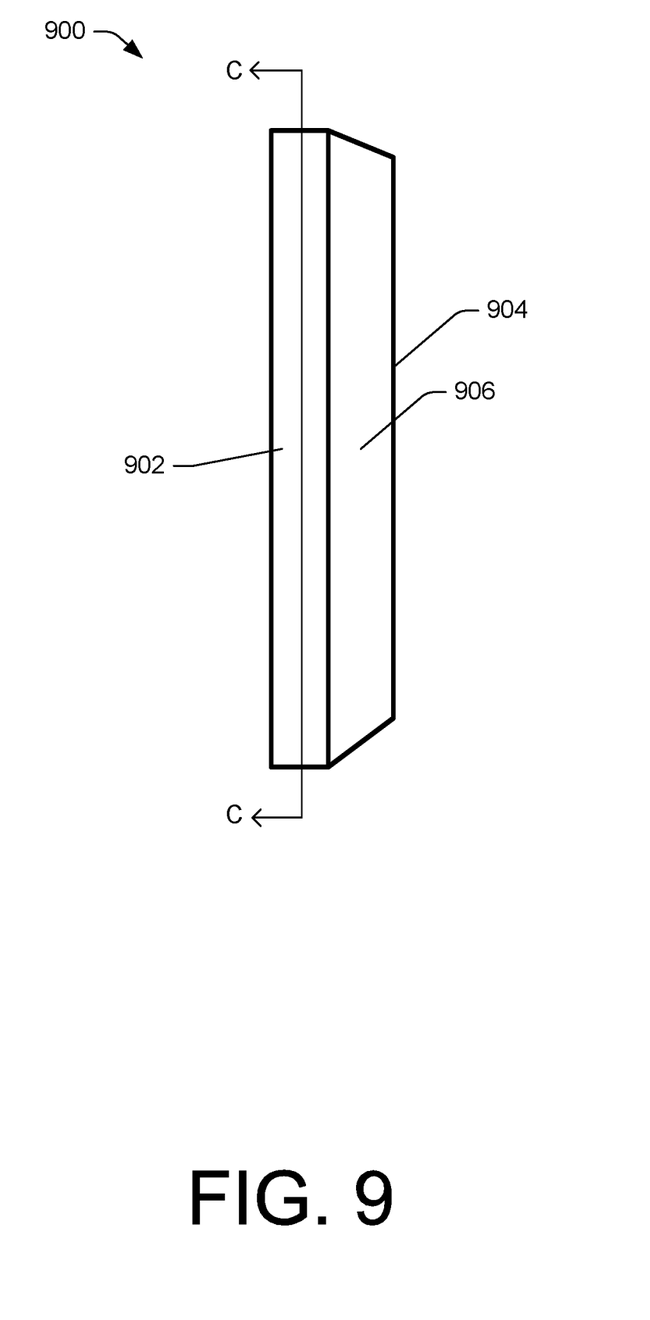
FIG. 9 is a perspective view of an illustrative divider panel.

FIG. 9 is a perspective view of an illustrative divider panel 900. The divider panel 900 may be the same as or similar to the divider panel 114 shown in FIG. 1, for example.

The divider panel 900 may include a first end 902 that contacts the interior side of the front panel 104(1) and a second end 904 that contacts the interior side of the back panel 104(2) when the divider panel 900 is inserted into the cavity 102 of the bag 100 as shown in FIG. 1 (where the divider panel is shown as divider panel 114). The divider panel 900 includes a sidewall 906, which may function to maintain a general location of items within an internal cavity formed by the divider panel being placed within the bag 100 and secured via the strips 112 (shown in FIG. 1). Coupling features that cause the divider panel 900 to couple to the strips are located in or on the first end 902 and the second end 904, as discussed below.

Figure 10:
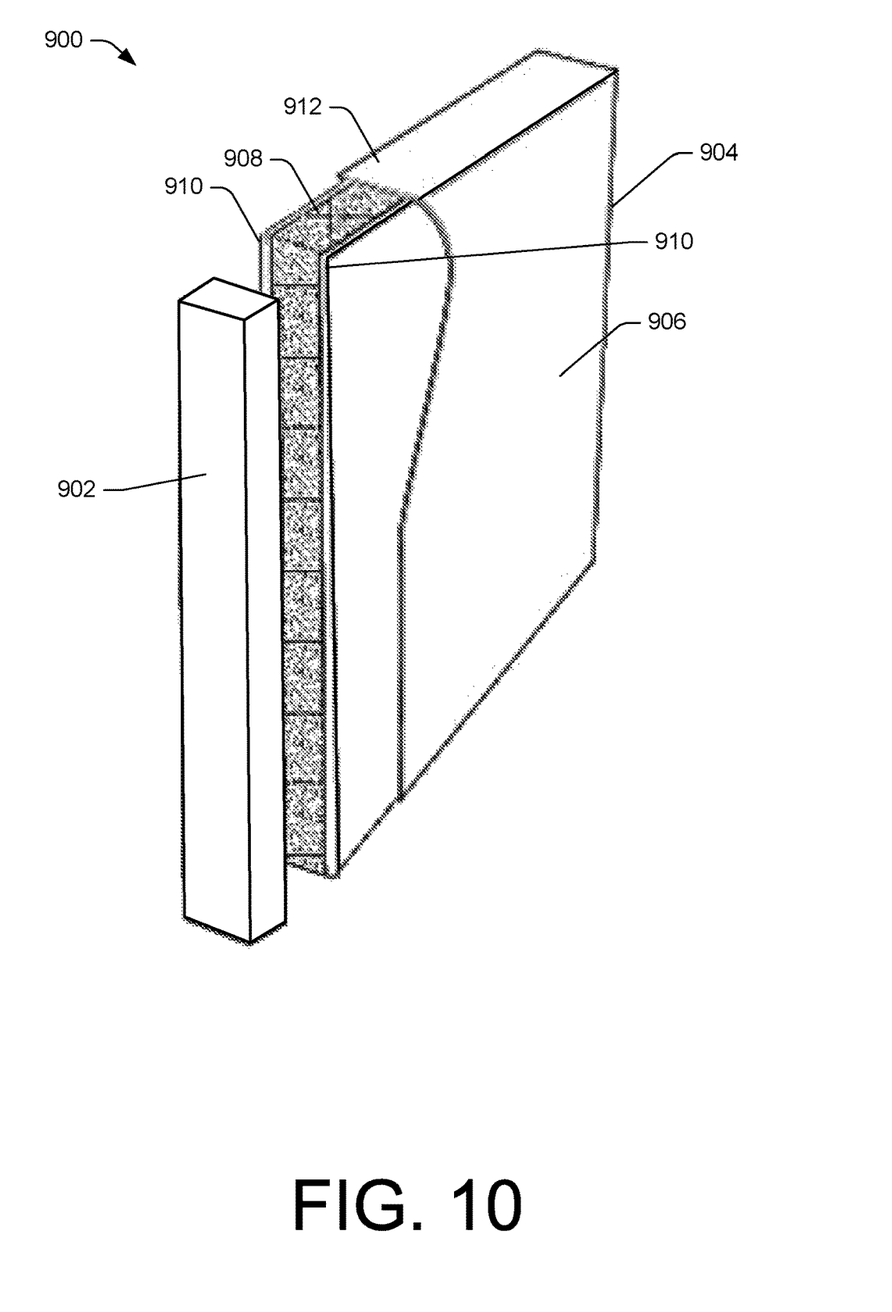
FIG. 10 is a perspective view of the illustrative divider panel shown in FIG. 9, and including a cutout to view layers of the divider panel.

FIG. 10 is a perspective view of the illustrative divider panel 900 shown with a cutout to view layers of the divider panel. The divider panel 900 may be the same as or similar to the divider panel 114 shown in FIG. 1, for example.

The divider panel 900 may include multiple layers. The divider panel 900 may include a first layer 908, which may be a foam or core. The divider panel 900 may include second layers 910 that cover the first layer 908. For example, the second layers 910 may be formed of honeycomb board or plastic panel or compressed fiber. The divider panel 900 may include a third layer 912 that covers the first layer 908 and the second layers 910. The third layer 912 may be an outer fabric. For example, the third layer 912 may be formed of a nylon fabric. The fabric may be selected to have resistance to odor, resistance to wear, resistance to discoloration or staining, and/or have other desirable properties.

Figure 11:
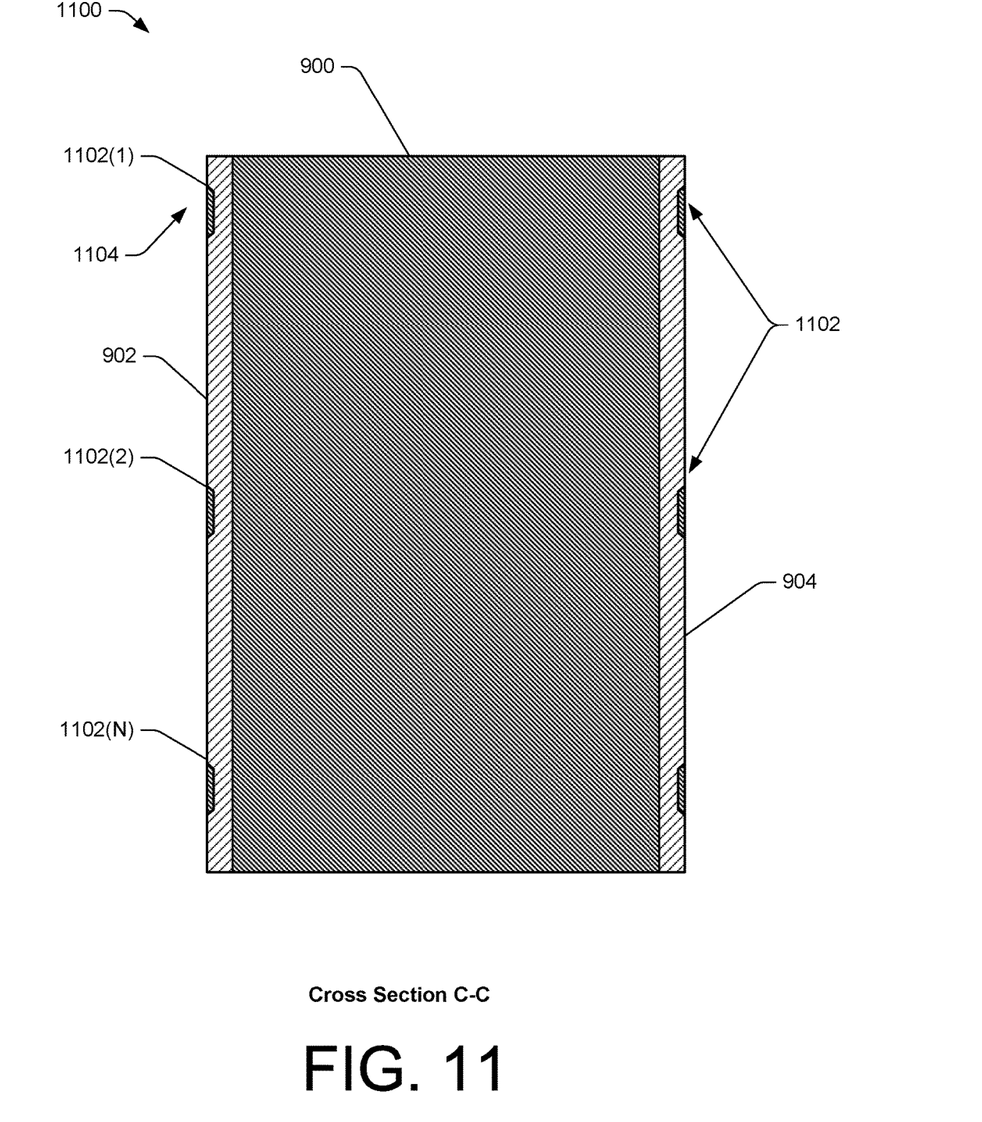
FIG. 11 is a cross sectional side elevation view of a right side of the divider panel.

FIG. 11 is a cross sectional side elevation view of a right side 1100 of the divider panel 900, via the cross section C-C shown in FIG. 9. The divider panel 900 includes coupling features 1102 located along the first end 902 and the second end 904. The number of coupling features may be the same as the number of strips, such as the strips 112 shown in FIG. 6. In some embodiments, the divider panel 900 may include three strips, a first coupling feature 1102(1), a second coupling feature 1102(2), and a third coupling feature 1102(N); however, more or fewer coupling features may be included on each end of the divider panel. The coupling features are spaced a same or similar distance apart as the strips 112 shown in FIG. 6. In some embodiments, the coupling features may be magnets. The magnets may be embedded in the divider panel 900 to create a substantially planar edge 1104 that magnetically mates to a substantially planar portions of surfaces formed by the front panel 104(1) and the back panel 104(2) to inhibit thermal leakage between the first interior cavity and the second interior cavity. However, the coupling features may be ferrous metal, snaps, hooks, loops, portions that insert into the strips 112, and/or other coupling features to slidably engage the strips, while maintaining some resistance (friction) to prevent unintentional movement of the divider panel 900 within the cavity of the bag.

Figure 12:
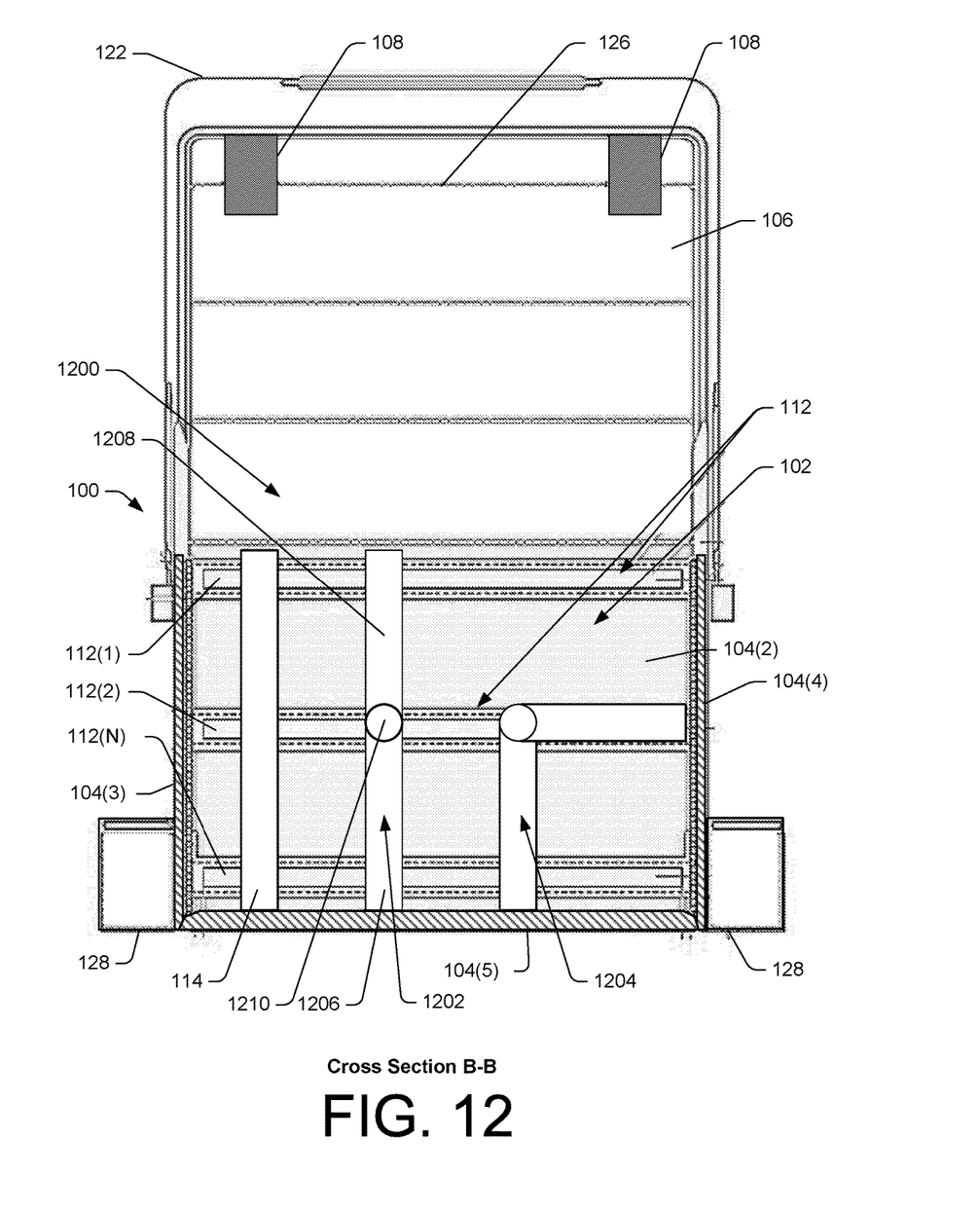

FIG. 12 is a cross sectional side elevation view of the convertible food delivery bag 100 showing the interior side of a back panel of the convertible food delivery bag that includes strips to couple to illustrative divider panels 1200. FIG. 12 also shows the divider panel 114 coupled to the strips 112, a first bendable divider panel 1202 coupled to the strips 112, and a second bendable divider panel 1204 coupled to the strips 112. As shown, multiple divider panels may be used with the bag 100, such as two or more divider panels. The first bendable divider 1202 may include at least a first portion 1206 coupled to a second portion 1208 by a joint 1210 (or malleable portion). The joint 1210 may enable bending of the first bendable divider 1202, such as to create an angle between the first portion 1206 and the second portion 1208. As shown by the second bendable divider panel 1204, the second bendable divider panel 1204 may be bent at the joint to enable creating an internal cavity in a corner of the cavity 102 of the bag 100. Thus, in some embodiments, the divider panel may be configured to bend between the first portion 1206 and the second portion 1208 of the divider panel. The first portion 1206 and the second portion 1208 may secure to the strips 112 via the coupling features to define an internal cavity in a corner of the cavity 102 of the bag 100. As shown in FIG. 12, two of the coupling features of the second bendable divider panel 1204 may be coupled to a same strip (assuming the second bendable divider panel 1204 includes coupling features 1102 similar to the divider panel 900 shown in FIG. 11.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A convertible food delivery bag comprising:
    a plurality of panels defining a cavity, the panels including a front panel located opposite a back panel, a left panel located opposite a right panel, and a bottom panel, wherein the left panel is coupled between first ends of the front panel and the back panel, the right panel is coupled between second ends of the front panel and the back panel, and the bottom panel is coupled between third ends of the front panel the back panel, the left panel, and the right panel, wherein the panels are at least partially formed of fabric and at least some of the panels are stitched to an adjacent panel;
    a flap coupled to the back panel, the flap configured to selectively close access to the cavity when the flap is selectively secured to an exterior surface of the front panel in a closed position;
    a plurality of ferrous strips including:
        at least a first ferrous strip and a second ferrous strip coupled to the front panel and extending horizontally between the left and right panel, and
        at least a third ferrous strip and a fourth ferrous strip coupled to the back panel and extending horizontally between the left and right panel, wherein the first, second, third, and fourth ferrous strips are oriented substantially parallel to the bottom panel, wherein the first ferrous strip is positioned opposite and level with the third ferrous strip, and the second ferrous strip is positioned opposite and level with the fourth ferrous strip; and
    at least one divider panel having a width that spans between the front panel and the back panel and a height that spans between the bottom panel and the flap in the closed position, wherein the divider panel includes a front end that includes a first plurality of magnets and a back end that includes a second plurality of magnets, wherein the front end is magnetically attracted to the first ferrous strip and the second ferrous strip, and wherein the back end is magnetically attracted to the third ferrous strip and the fourth ferrous strip, the divider panel configured to define a first interior cavity that is at least partially thermally isolated by the divider panel from a second interior cavity within the cavity when the divider panel is magnetically secured in the cavity and the flap is in the closed position.

2. The convertible food delivery bag as recited in claim 1, wherein the front panel includes a first portion foldable about a first crease, the first portion configured to at least partially close access to the cavity in a first position creating a first volume, and wherein the front panel includes at least a second portion foldable about at least a second crease and a third crease to partially close access to the cavity in the second position to create a second volume smaller than the first volume.

3. The convertible food delivery bag as recited in claim 1, wherein the divider panel within the cavity is configured to magnetically attract to different locations along the plurality of ferrous strips to enable adjustment of a position of the divider panel within the cavity to enlarge a first size of the first interior cavity and reduce a second size of the second interior cavity.

4. The convertible food delivery bag as recited in claim 1, wherein the magnets are embedded in the divider panel to create a substantially planar edge that magnetically mates to substantially planar portions of surfaces formed by the front panel and the back panel to inhibit thermal leakage between the first interior cavity and the second interior cavity.

5. The convertible food delivery bag as recited in claim 1, wherein the divider panel includes a joint that spans the width of the divider panel, the joint located at a height substantially level with at least the first and third ferrous strips or the second and fourth ferrous strips when the divider panel is positioned perpendicular to the first ferrous strip, and wherein a portion of the bendable divider panel is configured to rotate about the joint and orient parallel to the first ferrous strip.

6. An apparatus comprising:
    a container including a cavity defined by at least a front panel located opposite a back panel, side panels, and a bottom panel, wherein the back panel extends past the front panel to form a cover that is configured to couple to an exterior surface of the front panel to selectively thermally isolate the cavity from an exterior environment, wherein the side panels including at least a first side panel and a second side panel;
    a plurality of ferrous strips including:
        at least a first ferrous strip and a second ferrous strip coupled to the front panel and extending horizontally between the first and second side panels, and
        at least a third ferrous strip and a fourth ferrous strip coupled to the back panel and extending horizontally between the first side panel and the second side panel, wherein the first, second, third, and fourth ferrous strips are oriented substantially parallel to the bottom panel, wherein the first ferrous strip is located opposite the third ferrous strip, and the second ferrous strip is located opposite the fourth ferrous strip; and
    a divider panel having a width that spans between the front panel and the back panel when the divider panel is inserted into the cavity of the container and a height that spans between the bottom panel and the cover coupled to the front panel, wherein the divider panel includes a first end that includes a first plurality of magnets and a second end that includes a second plurality of magnets, wherein the first end is magnetically attracted to the first ferrous strip and the second ferrous strip, and wherein the second end is magnetically attracted to the third ferrous strip and the fourth ferrous strip, the divider panel configured to define a first interior cavity that is at least partially thermally isolated by the divider panel from a second interior cavity within the cavity when the divider panel is secured in the cavity and the cover is coupled to the front panel.

7. The apparatus as recited in claim 6, wherein the front panel includes a first portion foldable about a first crease, the first portion configured to at least partially close access to the cavity in a first position creating a first volume, and wherein the front panel includes at least a second portion foldable about at least a second crease and a third crease to partially close access to the cavity in a second position to create a second volume smaller than the first volume.

8. The apparatus as recited in claim 6, wherein the divider panel within the cavity is configured to magnetically attract to different locations along the plurality of ferrous strips to enable adjustment of a position of the divider panel within the cavity to enlarge a first size of the first interior cavity and reduce a second size of the second interior cavity.

9. The apparatus as recited in claim 6, wherein the container includes a first volume when the first side panel and the second side panel are substantially planar, and wherein the container includes a second volume that is smaller than the first volume when portions of the side panels are folded inward toward the divider panel along creases formed in the side panels, the creases configured to convert the container from having the first volume configured in a first shape to stow a first temperature-sensitive item in a horizontal configuration to the second volume configured in a second shape to stow a second temperature-sensitive item in a vertical configuration.

10. The apparatus as recited in claim 6, wherein at least one of the divider panel, the back panel, the front panel, or the side panels includes an elastic strap configured to secure at least one of food containers or beverage containers to the corresponding panel during transport of the bag.

11. The apparatus as recited in claim 6, wherein the divider panel, the back panel, the front panel, and the side panels include thermal insulation, and wherein at least the side panels include a rigid member that maintains a separation distance between the front panel and the back panel.

12. The apparatus as recited in claim 6, further comprising a beverage holder coupled to an exterior side of at least one of the side panels, the beverage holder including an adjustable coupler configured to securely position a beverage container of various sizes and geometries in an upright position in the beverage holder when the container is used in a horizontal configuration and when the container is used in a vertical configuration.

13. The apparatus as recited in claim 6, wherein the divider panel comprises a first portion and a second portion of the divider panel that are adjustable relative to each other, the first portion and the second portion configured to secure to the ferrous strips to define the first internal cavity in a corner of the cavity.

14. An apparatus comprising:
a bag including a cavity defined by at least a front panel located opposite a back panel, a left panel located opposite a right panel, and a bottom panel, wherein the left panel is coupled between first ends of the front panel and the back panel, the right panel is coupled between second ends of the front panel and the back panel, and the bottom panel is coupled between third ends of the front panel the back panel, the left panel, and the right panel, wherein the back panel extends past the front panel to form a flap that is configured to couple to an exterior surface of the front panel in a closed position to thermally isolate the cavity from an exterior environment;
a plurality of ferrous strips including:
at least a first ferrous strip and a second ferrous strip coupled to the front panel and extending horizontally between the left and right panel, and
at least a third ferrous strip and a fourth ferrous strip coupled to the back panel and extending horizontally between the left and right panel, wherein the first, second, third, and fourth ferrous strips are oriented substantially parallel to the third ends of the front panel and the back panel, wherein the first ferrous strip is located opposite the third ferrous strip, and the second ferrous strip is located opposite the fourth ferrous strip; and
at least one divider panel having a width that spans between the front panel and the back panel when the divider panel is inserted into the cavity of the bag, the divider panel including a front end that includes a first plurality of magnets and a back end that includes a second plurality of magnets, wherein the front end is magnetically attracted to the first ferrous strip and the second strip, and wherein the back end is magnetically attracted to the third ferrous strip and the fourth ferrous strip, the divider panel configured to define a first interior cavity that is at least partially thermally isolated by the divider panel from a second interior cavity within the cavity when the divider panel is magnetically secured in the cavity and the flap is coupled to the front panel.

15. The apparatus as recited in claim 14, wherein the bag includes a cavity having a first volume when the right panel and the left panel are substantially planar, and wherein the bag includes a cavity having a second volume that is smaller than the first volume when portions of the right panel and the left panel are folded inward toward the divider panel along creases formed in the side panels, the creases configured to convert the bag from having the first volume configured in a first shape to stow a first item in a horizontal configuration to the second volume configured in a second shape to stow a second item in a vertical configuration.

16. The apparatus as recited in claim 14, wherein the divider panel comprises a first portion and a second portion of the divider panel that are adjustable relative to each other, the first portion and the second portion configured to secure to the plurality ferrous strips via the magnets to define the first internal cavity in a corner of the cavity.

17. The apparatus as recited in claim 14, wherein the flap is coupled to the front panel by a magnet that attracts to one of the ferrous strips included in the front panel.

18. The apparatus as recited in claim 14, wherein the divider panel, the back panel, the front panel, the right panel, and the left panel include thermal insulation, and wherein at least the side panels include a rigid member that maintains a separation distance between the front panel and the back panel.

19. The apparatus as recited in claim 14, wherein at least one of the divider panel, the back panel, the front panel, the right panel, or the left panel includes an elastic strap configured to secure at least one of food containers or beverage containers to the corresponding panel during transport of the bag.

20. The apparatus as recited in claim 14, wherein the front panel includes a first portion foldable about a first crease, the first portion configured to at least partially close access to the cavity in a first position creating a first volume, and wherein the front panel includes at least a second portion foldable about at least a second crease and a third crease to partially close access to the cavity in the second position to create a second volume smaller than the first volume.

* * * * *